United States Patent Office 3,000,994
Patented Sept. 19, 1961

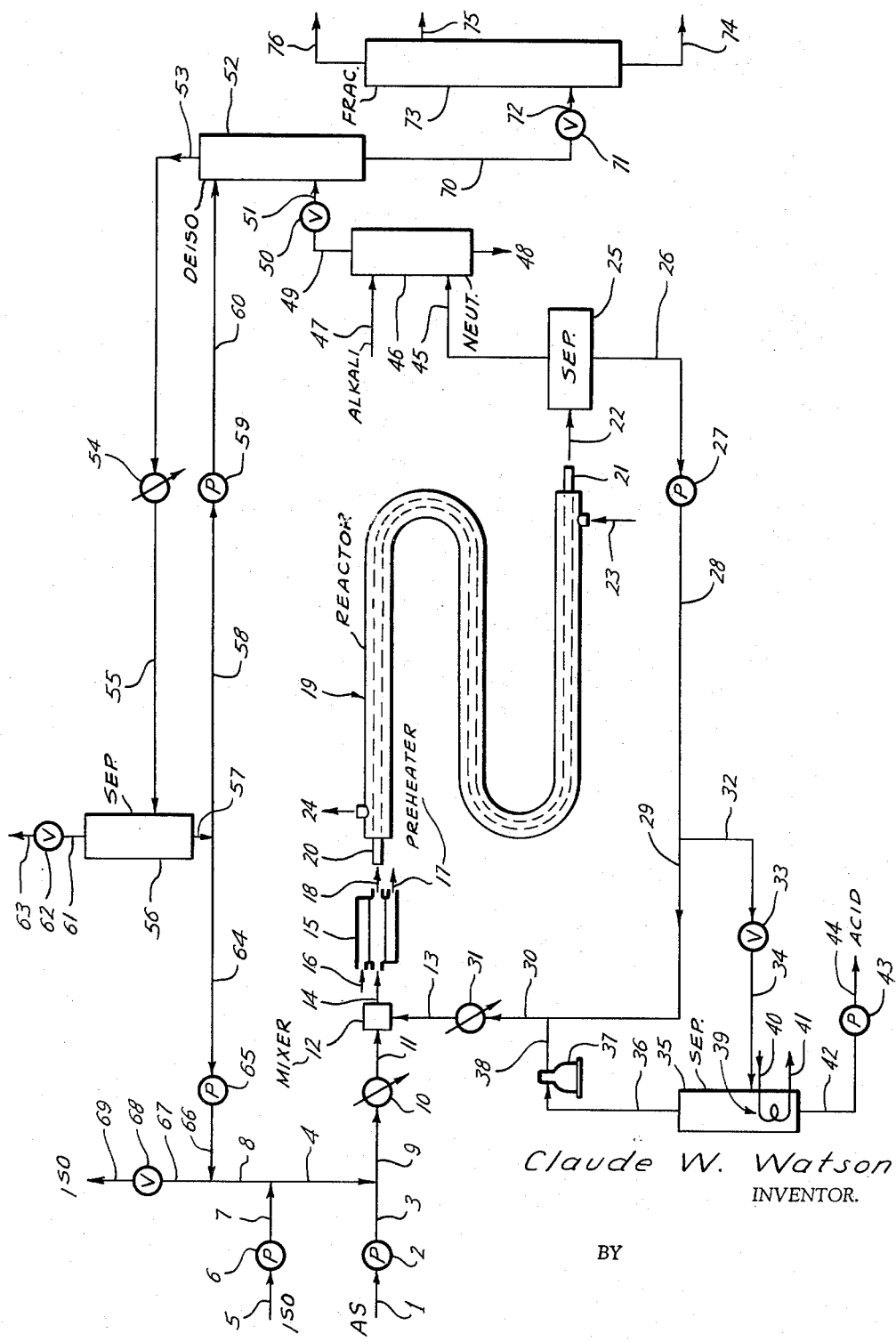

---

3,000,994
ALKYLATION OF ISOPARAFFINS WITH ALKYL SULFATES
Claude W. Watson, 5000 Lakeshore, Port Arthur, Tex.;
Myrtle H. Watson, executrix of said Claude W. Watson, deceased
Filed Sept. 23, 1957, Ser. No. 685,693
10 Claims. (Cl. 260—683.61)

This invention relates to a process for the alkylation of isoparaffin hydrocarbons with the alkyl sulfates. The isoparaffins are those containing one or more tertiary hydrogen atoms and will comprise a mixture of isobutane with other isoparaffins or isobutane alone. The alkyl sulfates will be comprised of those produced in the reaction of olefins other than ethylene with aqueous sulfuric acid containing 96.4 to 98.2% sulfuric acid by weight. To a solution of the alkyl sulfates in the isoparaffins is added a recycled stream of the acid liberated as a result of the alkylation reaction which is completed in a flowing stream at a constantly increasing temperature with the velocity of flow being such that there is substantially no back-mixing of the reaction mixture with the reaction mixture in a less advanced stage in the reaction. In one type of the application of this invention the product alkylate will be the result of the reaction of one mol of isobutane with one mol of olefin with the production of one mol of an isoparaffin in which the carbon atoms will be in the configuration of theory. In another type of application of the process of this invention isoparaffins other than isobutane will be reacted with olefins in the formation of an alkylate consisting substantially exclusively of the trimethyl pentanes when isobutane is incorporated as a reactant in the initial reaction mixture only to the extent required for a hydrogen balance in the overall reaction.

The processes available heretofore for the alkylation of olefins with alkyl sulfates are the processes which have been used in the attempted catalytic alkylation of isoparaffins with olefins using sulfuric acid as the catalyst. These processes known heretofore require for their operation the low temperatures which are obtainable only with refrigeration. An additional item of excessive expense in the operation of these processes known heretofore is the necessity for supplying large amounts of isobutane in the attempt to direct the course of the alkylation reaction with suppression of the undesirable reactions which include polymerization with excessive degradation of the sulfuric acid catalyst. These undesirable reactions have occurred to such an extent that large portions of the alkylate consist of the products which are not the result of the reaction of one mol of olefin with one mol of isobutane with the production of alkylates having carbon atoms in the configuration of theory, but are alkylates having a less or a greater number of carbon atoms than theory with the carbon atoms in a nondescript configuration. These undesirable reactions are of such nature and amount in the processes known heretofore, that the application of such processes have not been considered seriously in the alkylation of isoparaffins other than isobutane with the alkyl sulfates prepared by the reaction of olefins other than propylene and the butylenes. Even though it has been long known that propylene and the butylenes can be reacted with sulfuric acid in the formation of their sulfates this has not been done because with the alkylation processes known heretofore the results in the alkylation of isobutane with alkyl sulfates were not such as to justify the discontinuance of the catalytic alkylation of these olefins.

While the process of this invention can be used to advantage in the alkylation of isoparaffins with the alkyl sulfates prepared by methods known heretofore, the value of the process of this invention will be even greater when recourse is had to the superior process for the production of alkyl sulfates for which I have made an application for patent which has been assigned the Serial No. 684,370, dated September 16, 1957, now abandoned.

The simplicity and ready availability of all the apparatus and techniques required for the utilization of all the applications of the process of this invention will be in evidence from its diagrammatic illustration included herewith and its description to follow. The numeral 1 in the diagrammatic sketch designates a line through which is received from an undesignated source the alkyl sulfates which are delivered by pump 2 through line 3 into which there is also delivered the reactant isoparaffins received from an undesignated source through line 5 and discharged by pump 6 into line 7 connected to line 8 through which the recycled isobutane is received from a source to be identified hereinafter. The combined isoparaffins from line 4 mix with the alkyl sulfates from line 3 and the mixture discharged into line 9 in which a solution of the alkyl sulfates in the isoparaffins is formed and which solution is reduced in temperature in cooler 10 as may be appropriate prior to being discharged through line 11 into mixer 12 into which there is also discharged the recycled acid from line 13 with its dissolved isobutane from sources to be accounted for hereinafter. While the mixing of the solution of alkyl sulfates in the isoparaffins is of critical importance the requirements of the mixer can be met with the conventional equipment readily available for the effective mixing of liquids having the characteristics of the recycled acid and the solution of alkyl sulfates in the isoparaffins. In consequence, the detailed description of the mixer is not required. On its discharge through line 14 from mixer 12, the alkylation reaction mixture will be at the relatively low temperature obtainable with cooling water so that generally it must be preheated for the attainment of the desired initial alkylation reaction temperature. This preheating is accomplished by directing the alkylation reaction mixture from line 14 through the preheater 15 to which an appropriate heating medium such as hot water or steam is supplied through line 16 and discharged to waste or otherwise through line 17. The purpose of the preheating is merely to initiate the alkylation reaction which being exothermic proceeds rapidly with evolution of heat. In some applications of this invention this preheating of the alkylation reaction mixture can be dispensed with entirely since the alklation reaction begins immediately on mixing the reactants with the recycle acid, but usually without preheating the initial reaction rate is so slow as to require an inordinately long residence time for the completion of the alkylation reaction. In any event with assurance that it is at an appropriate temperature the alkylation reaction mixture is discharged through line 18 into the alkylation reactor 19. The design of the alkylation reactor must be such that the heat evolved in the alkylation reaction is dissipated with the completion of the alkylation reaction at a selected maximum temperature. Also the design of the alkylation reactor must provide for the flow of the stream of the alkylation reaction mixture at a velocity such that there will be intimate contact of the reactants while avoiding any back mixing which permits the mixing of the alkylation reaction mixture at an advanced stage of the reaction with the alkylation reaction mixture in a less advanced stage of the reaction. The requirements of the alkylation reaction are readily met with the well standardized shell and tube type heat exchangers and coolers. However, in order to illustrate to better advantage the requirements of the alkylation reactor I have shown in the accompanying diagrammatic sketch the double pipe type of reactor which consists of an inner pipe into which the initial alkylation reaction mixture is introduced at its inlet 20 and on completion of the alkylation reaction, the reacted mixture is discharged from the outlet 21 of the inner pipe through line 22. Into the outside pipe of the double pipe reactor 19 an appropriate cooling medium is introduced at one end through line 23 and is discharged from the other end through line 24 to exhaust or disposition as may be appropriate. In order to provide the required degree of mixing of the components of the alkylation reaction mixture without back-mixing, the necessary velocity of flow can be properly related to heat exchange surface by employing as many of the double pipe coils in parallel of such length as may be required for the appropriate pressure loss due to the flow through the coils when the ratios of the sizes of the pipes comprising the double pipe are properly chosen. The design of the alkylation reactor will include the selection of an appropriate combination of the temperature and residence time of alkylation reaction mixture which is composed of the reactants and recycled isobutane all proportioned to the recycled acid as delineated hereinafter. On completion of the alkylation reaction, the reacted mixture is discharged through line 22 into the separating vessel which may be of a conventional type in view of the readiness with which the acid and hydrocarbon phases separate at the temperatures at which the alkylation reaction is completed. In the separator 25 the selected amount of acid is retained and regulated by its rate of withdrawal through line 26 being controlled by pump 27 which discharges the acid through line 28. A portion of the separated acid is directed through lines 29 and 30 into cooler 31 in which the recycled acid is cooled to the appropriate temperature and constitutes the recycled acid which is delivered through line 13 as already stated in the foregoing. A portion of the separated acid is directed through line 32 at a rate controlled by the regulating valve 33 for delivery of the product acid through line 34 into separating vessel 35 in which the isobutane retained in the separating vessel is vaporized and withdrawn from the top of the separator through line 36. By means of compressor 37 the isobutane vaporized in the vessel 35 is discharged through line 38 into line 30 in which it is combined with the recycled acid for the appropriate reduction of temperature in cooler 31 as referred to in the foregoing. The pressure in the separating vessel 35 is maintained as may be required for the vaporization of the isobutane held in chemical combination in the acid. The vaporization of the isobutane reduces the temperature in the separating vessel 35 to which additional cooling may be supplied as for example, by means of coil 29 through which an appropriate cooling medium is passed from its inlet 40 to its outlet 41. The product acid when withdrawn from the separating vessel 35 through line 42 by means of pump 43 should be at a temperature lower than the temperature at which it will be stored for the appropriate reuse to which it is delivered through line 44. From the top of the separator 25 the alkylate is directed through line 45 into vessel 46 in which the alkylate is treated with an alkali introduced near the top through line 47 and withdrawn from the bottom through line 48. The amount of alkali required for the neutralization of the alkylate will be small, since the amount of acid entrained in the acid will be almost negligible in view of the readiness with which the acid is separated from the alkylates due to the relatively high temperature at which the alkylation reaction is completed as already emphasized in the foregoing. The alkali washed alkylate is withdrawn from the top of the treating vessel 46 through line 49 with a reduction in pressure controlled by regulating valve 50 placed in line 51 through which it is introduced into the de-isobutanization tower 52. The heat required for the vaporization of the isobutane may be furnished by its reduction in temperature associated with its reduction of pressure through the regulating valve 50. In any event, additional heat may be supplied, if required, to the bottom of the de-isobutanizer 52 by any conventional means as may be appropriate. The vaporized isobutane is withdrawn from the top of the de-isobutanizer 52 through line 53 and condenser 54 and the condensate delivered through line 55 into the separator 56. The liquid isobutane is withdrawn from separator 56 through line 57 with some of it directed through line 51 at a rate controlled by the speed of the pump 59 which discharges this portion of the liquid isobutane into the top of the fractionating tower in which the liquid isobutane serves as reflux for the rectification of the isobutane is required for the removal of the small amounts of alkylate which may be vaporized along with the isobutane. The amount of such rectification of the isobutane will be small in any event, and in some applications the alkylate may me separated from the isobutane in the required purity by a simple flashing operation due to the wide differences in the volatility of the isobutane and the most volatile portions of the alkylate. Usually the isobutane will be entirely free of non-condensable gases but in the event that such gases are brought into the process inadvertently or otherwise, an accumulation of such gases can be avoided by their withdrawal from the separator 56 through line 61 at a rate controlled by valve 62 for discharge through line 63 for the appropriate disposition. The isobutane recycle is withdrawn from line 57 through line 64 at a rate controlled by the speed of the pump 65 as required to maintain the desired level of the condensed isobutane in the separator 56. From the line 66 through which the isobutane is discharged by the pump 65, the isobutane recycle is delivered through line 8 for its incorporation in the alkylation reaction mixture as already described in the foregoing. From line 66 a portion of the condensed isobutane may be withdrawn through line 67 at a rate controlled by valve 68 for discharge through line 69 for the disposition discussed in the immediately following. Usually the isobutane as a reactant with or without its admixture with other isoparaffins introduced through line 5 already referred to in the foregoing will be of a purity such that no fractionation of the isobutane recycle will be required for the removal of contaminants such as normal butane and propane. But in the event that such contaminants having volatilities near that of isobutane are introduced into the process, it will be necessary to withdraw from line 66 an appropriately small amount of the condensed isobutane through line 67 controlled by valve 68 for delivery through line 69 for the fractionation not shown in the diagrammatic sketch whereby the contaminants are removed from the system with the recovery and return of isobutane of the desired purity. The alkylate free from the recycle isobutane will be withdrawn from the fractionating tower 52 through line 70 at a rate controlled by valve 71 and delivered through line 72 into a fractionation system such as, for example, the tower 73 equipped for the production of the fraction of the least volatility discharged through line 74, and a fraction of intermediate volatility through line 75 and the most volatile fraction through line 76.

Even though the fractionation system useful in the various applications of the process of this invention will vary widely, there is no requirement for their detailed description because in any event the fractionation requirements are so straightforward that only the readily available and well known fractionation will be used. For example, when isobutane is the sole reactant isoparaffin, the alkylates may vary over the entire range of volatilities demanded by the utilization of the alkylate as gasoline or as fuel oils depending on the volatility of the olefins reacted with sulfuric acid in the formation of the reactant alkyl sulfates. In such applications it may be required that the alkylate be separated into fractions of the various boiling ranges required in the various possible dispositions. When isoparaffins other than isobutane are included as reactants, the major product will be the trimethyl pentanes along with unreactive hydrocarbons of widely varying volatility such as the normal paraffins and naphthenes associated with the isoparaffins in some of the sources of the isoparaffins. Also the conventional fractionation systems will be adequate for the aromatic hydrocarbons which are present in some sources of the isoparaffins and which react in the process of this invention in the production of the alkyl arene hydrocarbons including tertiary butyl benzenes and others containing tertiary butyl groups not present in the reactants.

From its illustration as given in the accompanying diagrammatic sketch together with its description presented in the foregoing, it follows that the process of this invention is of such nature that the selection of the well known and readily available apparatus required in any and all of its applications can be made with only a minimum of straightforward investigations required for the determination of the specific conditions appropriate to a particular application within the broad range of the utility of the invention. However, the maximum potentialities of the process of this invention can be realized to best advantage by recourse to the more elementary and fundamental features of the chemical mechanism which I have delineated in the development and establishment of this invention. In my delineation of this chemical mechanism it was helpful to take into account all of the reactions of sulfuric acid with hydrocarbons, not only in all the potential applications of this invention, but the reactions of sulfuric acid and hydrocarbons in other processes as well. Moreover, all these reactions must be related to the reactions of hydrocarbons with substances other than sulfuric acid including particularly hydrofluoric and phosphoric acids, the silica-alumina and other cracking catalysts and other substances having acidic characteristics including the aluminum and other halides useful in the beneficiation of hydrocarbons in commercial processes. In my delineation of the pertinent chemical mechanisms their comprehensive scope has been made possible by my recognition of the theoretical basis for the exclusion principle which, heretofore, has been known only on an empirical basis, in accounting for the disposition of electrons in the extra nuclear structure of the chemical elements. By others, atomic structures are considered to have a nucleus in which resides all of the positive charges and an extra nuclear portion composed exclusively of electrons in number sufficient to balance the number of positive charges in the nucleus. Through chemistry and the large number of new particles of matter revealed by the newer physics, I have found that the extra nuclear structures of the chemical elements contain particles other than electrons and that not all of the negative charges can be accounted for in the extra nuclear structure. My theoretical basis for the exclusion principle accounts for all the extra nuclear particles and their disposition and correlation with the more relevant particles of the nucleus. While my concept of atomic structures has been vital and, in fact, indispensable to the development and establishment of the process of this invention it is only necessary to mention these basic departures from the concepts of others in order to show that the potentialities of this invention have been visualized only by an extension of the exclusion principle. By recourse to these basically new concepts of the structures of the chemical elements and the changes in these structures which result from chemical reactions it has been possible to delineate the few reactions of sulfuric acid with hydrocarbons which are most pertinent to the realization of the maximum potentialities of the process of this invention.

Fundamental to the proper utilization of the chemical reactions of major importance in the realization of the potentialities of the process is the mechanism of the self-ionization of sulfuric acid as represented in the equation (1) 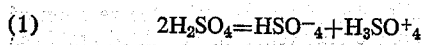 $2H_2SO_4 = HSO_4^- + H_3SO_4^+$ Heretofore, by others the reaction of Equation 1 has been referred to as the "autoprotolysis" of sulfuric acid in accordance with the widely held but erroneous belief that self-ionization is the result of the release of a proton by one molecule followed by its transfer to and its acceptance by a second molecule of the acid. Among the reasons for the invalidity of the proton ionization mechanism is the impossible separate existence of the proton under the conditions which prevail during the ionization of acids. The proton is a nuclear particle requiring for its release and separate existence during its transfer extremely high energy inputs, far beyond the energy involved in the formation of sulfuric acid from its elements. I have found that the ionization of the reaction of Equation 1 is due to the transfer of an electron from one molecule to another accompanied by the switching of a hydrogen atom between the two molecules in the opposite direction. The energy requirements for this mechanism is in accordance with the observed relatively minute energy inputs associated with the insensible increase in temperature adequate for an observable increase in the electrical conductance which is, of course, a measure of the increase in ionization. In accordance with the widely used terminology and for reasons made evident hereinafter, the negative ion of Equation 1 will be referred to as the "lyate" ion while the positive ion will be designated as the "lyonium" ion. In aqueous sulfuric acid some of the water reacts as in the equation (2) 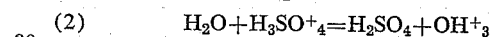 $H_2O + H_3SO_4^+ = H_2SO_4 + OH_3^+$ The addition of Equations 1 and 2 gives the equation (3) 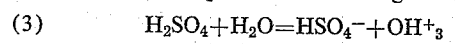 $H_2SO_4 + H_2O = HSO_4^- + OH_3^+$ Equation 3 represents the more familiar ionization of sulfuric acid resulting from its direct reaction with water. The negative ion formed in the direct ionization of sulfuric acid by water will be referred to as the "bisulfate" ion in accordance with the usual terminology in order to distinguish its origin from the lyate ion, because the two negative ions are otherwise indistinguishable. The resultant positive ion of Equations 2 and 3 has been regarded universally heretofore as having its origin in the addition to a water molecule of a proton released by the acid in accordance with the proton theory of acids. It is for this reason that the ion $OH_3^+$ has been referred to at times as the "hydrogen ion" which is truly a proton. The incorrectness of this terminology is recognized in the use by others of the terms "oxonium" or "hydronium" ions to designate the $OH_3^+$ ion in view of the widely acknowledged impossible separate existence of the proton. Hereinafter, the $OH_3^+$ ion will be referred to as the "hydroxonium" ion in order to give expression to the joint participation of the oxygen and hydrogen atoms indispensable to the ionization which results from the direct reaction of water with acids, which reaction also is traceable to the exchange of electrons and hydrogen atoms between the molecules of acid and water. The evidence for this mechanism of ionization parallels that given above for the self-ionization of sulfuric acid. This basically new concept of the mechanism of the ionization of acids which I have delineated is in accordance with my extension of the exclusion principle all of which will be highly useful in the realization of the potentialities of the process of this invention as will be brought out more fully hereinafter in my delineation of the reactions of sulfuric acid with the hydrocarbons of interest in this invention. While my recourse to my extension of the exclusion principle has been highly important in the development and establishment of the process of this invention, in its practical applications its potentialities can be realized from my delineation of the simple reactions of pertinent hydrocarbons which are met with in the process of this invention with the complete elimination of the undesirable reactions which characterize the processes known heretofore.

Of great importance in the practical applications of the process of this invention are the reactions of sulfuric acid with olefins in the formation of alkyl sulfates which have been delineated in detail in my patent application Serial No. 706,003, dated December 30, 1957, now U.S. Patent No. 2,945,904. These reactions are not further discussed in detail in this disclosure. For the purposes of this invention, it is sufficient to know that a stable reaction product of sulfuric acid with olefins contains the di-alkyl sulfate and that on the addition of sulfuric acid as is done by the recycling of sulfuric acid in the process of the invention, the first and immediate reaction occurs in the alkylation reaction mixture in accordance with the equation (4) $(C_nH_{2n+1})_2SO_4 + OH^+_3$
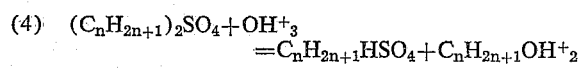
$= C_nH_{2n+1}HSO_4 + C_nH_{2n+1}OH^+_2$ In Equation 4 $n$ in the symbol $C_nH_{2n+1}$ represents an olefin having any number of carbon atoms. This symbolization has been used to give expression to the fact that all olefins can be reacted with sulfuric acid in the formation of alkyl sulfates useful as reactants in the process of this invention. The reactant hydroxonium ion of Equation 4 is, of course, supplied in the recycled acid in accordance with this invention. The limited addition of the recycled acid and its immediate and complete mixing with the alkyl sulfates as provided for in accordance with the foregoing description of the process of this invention, substantially precludes the unfavorable reactions which occur only in the interface between the acid and the alkyl sulfate because the residence time of the reactants in the interface is too short for appreciable reaction at the relatively low temperature of the interface. On and during completion of the mixing, there is further reaction in accordance with Equation 4 accompanied by further ionization in accordance with Equations 1, 2 and 3 as demanded by chemical equilibrium. The lyate ions present in the added recycled acid and the lyate ions formed in accordance with the equilibrium demands of Equation 4 are available for reaction with the reactant isoparaffins present in solution in the alkyl sulfates charged. For reasons which will be evident hereinafter, the mechanism of the alkylation will be delineated first on the basis of isobutane as the reactant isoparaffin following which other isoparaffins as reactants will be delineated. The reaction of isobutane with the lyate ions brings about an even further ionization in the formation of a doubly charged alkyl lyate ion. This phenomenon can be accounted for to the best advantage by citing the reaction isobutane as in the equation (5) $HSO_4^- + C_4H_{10} + H_2SO_4$
$= SO_4^{--}(CH_2—H)(C_3H_6—H) + H_3SO_4^+$ The reaction of Equation 5 arrived at through my extension of the exclusion principle is consistent with a wealth of empirical data which indicate the scission of isobutane into methyl and propyl fragments in the alkylation reaction. In the chemical mechanism I have delineated it is revealed that these two fragments occupy the positions of the hydrogen atoms of the two hydroxyl groups which accounts for the further ionization of Equation 5. The two hydrocarbon fragments included in the doubly charged resultant ion of Equation 5 are in reality alkene (olefinic) groups the accommodation of which in the doubly charged negative group is made possible by the tetravalency of both of the two oxygen atoms forming the two hydroxyl groups of the original uncharged acid molecule. Tetravalent oxygen, while of unusual occurrence, is known in other chemical compounds and is asserted here with confidence as a result of my extension of the exclusion principle. The structure of the doubly charged alkyl lyate ion having the two tetravalent oxygen atoms provides for a double bond to the hydrocarbon fragments and single bonds to the hydrogen and sulfur atoms. The doubly charged alkyl lyate ion having this structure is indispensable to the alkylation of isobutane which is effected in accordance with the equation (6) $SO_4^{--}(CH_2—H)(C_3H_6—H) + C_3H_7OH_2$
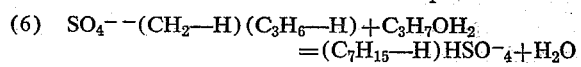
$= (C_7H_{15}—H)HSO^-_4 + H_2O$ The isopropyl hydroxonium ion was selected for illustration of the reaction of Equation 6 because propylene is the simplest olefin which will react in the formation of alkyl sulfates useful in the process of this invention. Ethylene alone of all the olefins is excluded in the production of the alkyl sulfates which will be charged to the process of this invention. Ethylene is excluded in the formation of these alkyl sulfates in accordance with the mechanism which I have delineated in my application for patent Serial No. 691,593 dated October 22, 1957, now abandoned. The formation of the resultant heptyl lyate ion of Equation 6 proceeds in a definite stepwise fashion as necessary in order to account for the configuration of the carbon atoms in the final alkylation product to be delineated hereinafter. The first step in the reaction of Equation 6 is the loss of an electron from the doubly ionized lyate ion to the isopropyl hydroxonium ion with the switching of the pseudo tertiary hydrogen atom of the isopropyl hydroxonium ion between these two reactions intermediate in a direction opposite to that in which the electron is transferred. This switching of the electron and the hydrogen atom with charge neutralization releases the propylene as such which then becomes attached in its straight chain configuration to the propyl group of the lyate ion. On completion of these steps leading to the attachment of the propylene in the lyate ion, the tetravalency of the oxygen atom in the second hydroxyl group is relieved by the binding of its hydrogen atom in the conventional bivalency of this oxygen atom with the release of the methylene group with the completion of the formation of the heptyl lyate ion of Equation 6. Finally, the heptane is formed by the neutralization of a lyonium ion in accordance with the equation (7) $(C_7H_{15}—H)HSO^-_4 + H_3SO^+_4 = C_7H_{16} + 2H_2SO_4$ The sulfuric acid released in the reaction of Equation 7 together with that released in Equation 2 is made available for its self-ionization with the formation of a lyonium ion which in turn reacts with the water released in Equation 6 thereby regenerating the hydroxonium ion in accordance with Equation 2. The hydroxonium ion is then available for reaction in accordance with the equation (8) $C_nH_{2n+1}HSO_4 + OH^+_3 = C_nH_{2n+1}OH^+_2 + H_2O$ The reactant mono-alkyl sulfate of Equation 8 is that released in Equation 4 and is available for reaction in Equation 8 on completion of the utilization of the di-alkyl sulfate in the reaction of Equation 4.

The reactions of Equations 1–8 inc. are adequate for an understanding of the basic chemical mechanism of this invention. An essential and novel feature of this invention is the provision for the presence of the alkyl sulfates as required for the exclusive reaction of water with the alkyl sulfates. This exclusive reaction gives assurance that the lyate ions react only with the isoparaffins. This feature of the process of this invention is in striking contrast to the alkylation processes known heretofore which due to the absence of the requisite alkyl sulfates allow the highly deleterious reactions of olefins with the lyate ions in the formation of the singly charged alkylate ions which react with the alkyl hydroxonium ions in the very complex reactions of polymerization and fragmentation which together with the so-called hydrogen exchange reactions account for the production of alkylate molecules having practically any number of carbon atoms either greater or less than the number of carbon atoms in the alkylate formed by the direct union with the reactant olefins and isoparaffins. In the process of this invention in accordance with the reaction of Equations 1–8 inc. the only reactions permitted are those leading to the direct coupling of one mol of the reactant isobutane with one mol of the reactant olefin. While the mechanism of the reactions of polymerization, fragmentation and hydrogen exchange characteristic of the processes known heretofore have been delineated completely by my application of my extension of the exclusion principle, the delineation of these highly complex reactions are not included here because it is entirely sufficient to have the assurance that all these reactions are completely excluded in the process of this invention.

While for convenience in illustration Equations 1–8 inc. were limited to the alkylation of isobutane with isopropyl sulfate it is to be emphasized that isobutane can be alkylated with the alkyl sulfates formed by the reaction of any olefin other than ethylene as stated in the foregoing. In all these alkylation reactions in the process of this invention the isobutane undergoes a carbon-carbon bond rupture with the formation of methylene and propylene fragments which add to the reactant olefin in a definite stepwise fashion as indicated in the foregoing. These recombination steps are such that two and only two methyl groups are present in the alkylate not present in the reactant olefin. Also the configuration of the carbon atoms in these alkylates are the same as the principal hydrocarbons occurring in the alkylates produced in the alkylation processes known heretofore. Thus, in the alkylation of isobutane with isopropyl sulfate the dimethyl pentanes are the exclusive alkylate products while in the alkylation of the butylenes and pentylenes the alkylate products are the trimethyl pentanes and trimethyl hexanes respectively. There are other rules governing the configuration of the carbon atoms in the alkylates of the process of this invention. For instance, there is no isomerization of olefins in the formation of the sulfates nor in their alkylation. The complete delineation here of the permissible configurations of the carbon atoms of all the alkylates resulting from the alkylation of isobutane with the alkyl sulfates of all the olefins, while not complex, would be tedious and not worthwhile.

While the reaction mechanism included in the foregoing has been in reference to the alkylation of isobutane with the alkyl sulfates formed by the reaction of sulfuric acid with the individual olefins, it is to be emphasized and understood that the process of this invention is applicable to the alkylation of isobutane with the alkyl sulfates formed in the reaction of sulfuric acid with a mixture of olefins in any proportion with the production of alkylates having a composition strictly proportional to the ratio of the olefins reacted in the formation of the alkyl sulfates.

All of the foregoing presentation has been concerned with the alkylation of isobutane with the mono-olefins, that is, the olefins having only one double bond per molecule. The process of this invention is also applicable to the alkylation of isobutane with the di-olefins, that is, olefins containing two double bonds per molecule. In the alkylation with the alkyl sulfates of the di-olefins, two mols of isobutane will be reacted for each mol of the di-olefin, one mol for each double bond. The alkylate resulting from the alkylation of the di-olefins while complex is not unduly so, and the configuration of the carbon atoms in the alkylate can be arrived at in accordance with the mechanism which determines the configuration of the carbon atoms in the direct alkylation of isobutane with the alkyl sulfates of the mono-olefins.

The reaction mechanism of isobutane with alkyl sulfates delineated in the foregoing serves as a prelude to the somewhat different mechanism in the alkylation of isoparaffins other than isobutane with alkyl sulfates. In order to visualize the alkylation of isoparaffins other than isobutane it is important to understand fully the structure of the doubly ionized lyate ion formed in the reaction of isobutane with sulfuric acid as set forth in the presentation of Equation 5 in the foregoing. Isoparaffins other than isobutane react in the formation of the doubly ionized isobutyl lyate ion identical with that of Equation 5. The higher isoparaffins react in the formation of this doubly ionized isobutyl lyate ion along with the production of methylene groups which are detached individually in the formation of the doubly ionized isobutyl lyate ion. The individual methylene groups thus detached are added individually to the hydroxonium ion and then to the intermediate alkyl hydroxonium ions with the eventual formation of trimethyl methyl (tertiary butyl hydroxonium) ions, and other alkyl hydroxonium ions some of which may be those having one more carbon atom than the reactant olefin. The methylene groups can add only to alkyl hydroxonium ions which have hydrogen atoms bonded to the carbon atom attached to the oxygen atom of the hydroxonium ion. This limitation on the addition of the methylene groups accounts for the preponderance of the tertiary butyl hydroxonium ions and for the fact that in the alkylation processes known heretofore there is an unexpectedly large production of the trimethyl pentanes, the amount of which is exceeded only by the alkylate corresponding to the direct addition of isobutane to the olefin being alkylated. The production of the trimethyl pentanes, heretofore unexpected and unpredictable, is explained by the mechanism of the alkylation reaction which I have delineated. Through my knowledge of this reaction I have made provision in the process of this invention for the substantially complete utilization of all the isoparaffins in the substantially exclusive production of the trimethyl pentanes. Due to the hydrogen deficiency in the production of the trimethyl pentanes in the alkylation of isoparaffins other than isobutane with alkyl sulfates, the feed in the process of this invention must contain along with the reactant alkyl sulfates and isoparaffins, sufficient isobutane to provide for the hydrogen deficiency. The amounts of isobutane which must be added is computed by use of the equation $$(9) \qquad A+B-\tfrac{3}{4}=C$$

In the formula of Equation 9, $A$ represents the average number of carbon atoms per mol of the isoparaffins while $B$ represents the average number of carbon atoms per mol of the olefins reacted in the formation of the alkyl sulfates and $C$ represents the number of mols of isobutane added. For example the application of Equation 9 in the alkylation of 2-methyl pentane (isohexane) with the pentylenes shows that three fourths of a mol of isobutane must be added $(6+5-\tfrac{3}{4}=\tfrac{3}{4}.)$ In the alkylation of 2,4 dimethyl decane with propyl sulfate one and three fourths mols of isobutane must be added per mol $(12+3-\tfrac{3}{4}=1\tfrac{3}{4})$.

The formulation of Equation 9 is the result of the application of the mechanism of the alkylation reaction that I have delinated according to which there must be in the alkyl sulfates at least one mol of olefin per mol of isoparaffin reacted. This follows from the formation of the tertiary butyl hydroxonium ions which result from the fragmentation of isoparaffins other than isobutane in accordance with the foregoing presentation. The tertiary butyl hydroxonium ions having no pseudo tertiary hydrogen atoms are more stable than other alkyl hydroxonium ions all of which do have pseudo tertiary hydrogen atoms. Accordingly, the alkyl hydroxonium ions having pseudo tertiary hydrogen atoms react preferentially with the doubly ionized isobutyl lyate ions with the formation of isoparaffins other than the trimethyl pentanes except, of course, in the case of the hydroxonium ions formed in the reaction of the straight chain butylenes. These isoparaffins other than the trimethyl pentanes accumulate until some of the tertiary butyl hydroxonium ions react in the formation of the trimethyl pentanes with the release of water which then permits the further reaction of the alkyl sulfates and in turn the fragmentation of the isoparaffins other than the trimethyl pentanes with the eventual consumption of all of the alkylation alkyl sulfates and isoparaffins with the exclusive formation of the trimethyl pentanes. From the free energy of the reaction of olefins with isoparaffins in the formation of the trimethyl pentanes it might appear that less than one mol of olefin of isoparaffins other than isobutane can be utilized in the formation of trimethyl pentanes. However, it is to be noted that olefins are not present in the hydrocarbon phase of the alkylation reaction mixture, therefore, the thermodynamic data involving the olefins are not pertinent to the computation of the actual equilibrium. Since the free energy of formation of the alkyl sulfates have not been determined, the equilibria involving the alkyl sulfates can not be calculated either. But the lack of such data and computations is not a handicap since in the actual practice of the process of this invention the ratio of the alkyl sulfates to the isoparaffins charged will be so adjusted that the concentration of isoparaffins other than isobutane in the product will be reduced to that desired with the corresponding increase in the concentration of the desired trimethyl pentanes. In general in all applications of the process of this invention it will be preferred to so proportion the alkyl sulfates to the isoparaffins other than isobutane as required for more than one mol of olefin in the alkyl sulfate for the exclusive production of trimethyl pentanes. This increased amount of alkyl sulfates is desirable on the basis of the kinetics and equilibrium considerations presented hereinafter. The isobutane requirements for the actual amount of alkyl sulfate can be computed by the slight modification of the formula of Equation 9. Thus, if in the alkylation of isohexane with pentyl sulfates it is found that 1.2 mols of pentylene is required for each mol of isohexane the isobutane requirements for the hydrogen balance will be found to be one mol instead of ¾ mol computed on the basis of the formula of Equation 9

$$(7+1.2(5)-\%=1.0)$$

While the formula of Equation 9 is useful in the computation of the actual consumption of isobutane in the production of the trimethyl pentanes in the alkylation of isoparaffins other than isobutane with alkyl sulfates in the process of this invention, the amount of isobutane which must be recycled to supply the amount of isobutane in the reaction mixture demanded by the equilibrium requirements of the alkylation must be computed on the basis of the acid to water ratio in the alkylation reaction mixture as delineated immediately hereinafter. In accordance with the chemical mechanism I have delineated, I have found that in the formation of the alkylation reaction mixture there must be at least five mols of sulfuric acid for each mol of water in the alkylation of isoparaffins with alkyl sulfates, if the undesirable reactions of the polymerization and fragmentation of the olefins are to be excluded completely. Of these five mols of acid, two mols are accounted for by their self-ionization in the reaction of Equation 1 required for the formation of the hydroxonium ion of Equation 2 which in turn is consumed in the formation of the alkyl hydroxonium ion by its reaction with the alkyl sulfates in the reactions of Equations 4 and 8. The isobutane accounts for the other three mols of acid in the formation of the doubly ionized isobutyl lyate ion of Equation 5 in which there is the production of the lyonium ion which consumes one mol of acid to which must be added the two mols of acid consumed in its self-ionization which furnishes the lyate ion for its reaction in accordance with Equation 5. The acid to water mol ratio of five accounted for in this chemical mechanism corresponds to 96.2% sulfuric acid by weight in exact agreement with the empirical data which show that in the alkylation processes known heretofore, the results obtainable with acids less concentrated than 96.2% are so poor as to make the processes practically inoperable. In the process of this invention if there is present in the alkylation reaction mixture more than one mol of water for each five mols of sulfuric acid, some of the water is available for its direct reaction with sulfuric acid as in the reaction of Equation 3 and as a result the olefins react with the lyate ion with both polymerization and fragmentation of the olefins. These undesirable reactions are precluded only by the provision for at least five mols of sulfuric acid for each mol of water and for the recyling of an amount of isobutane such that on completion of the alkylation reaction there is at least one mol of isobutane per mol of water in the reacted mixture. The necessity for this amount of unreacted isobutane on completion of the reaction of the alkyl sulfates is to avoid the degradation of the alkylate due to its reaction with the acid which is known to occur in the absence of sufficient excess of isobutane. These reactions of the alkylate with the acid not only lowers the quality of the alkylates but is also the cause of the fouling of the acid due to its accumulation of carbonaceous matter. These undesirable reactions are completely precluded in the process of this invention by its provision for the recycliing of an amount of isobutane such that there is contained in the initial reaction mixture at least one mol of isobutane in excess of the amount which will be consumed in the production of trimethyl pentanes in accordance with the presentation of the formula of Equation 9 and its modification in the foregoing.

In addition to the requirement for a minimum acid concentration and a minimum isobutane recycle requirement as delineated in the foregoing there is a requirement for a maximum acid concentration and a maximum isobutane recycle in the process of this invention. The maximum acid concentration is that corresponding to that of the constant boiling point mixture of aqueous sulfuric acid which is 98.2% sulfuric acid by weight. As is well known more concentrated sulfuric acid decomposes even at atmospheric temperatures with the formation of water and sulfur trioxide which in the presence of hydrocarbons is reduced to sulfur dioxide with the formation of highly unsaturated carbonaceous matter of indefinite structure. The maximum isobutane recycle is of critical importance in the alkylation of isoparaffins with alkyl sulfates in the production of the trimethyl pentanes. In the foregoing presentation of the mechanism of the fragmentation of isoparaffins other than isobutane it was shown that these higher molecular weight isoparaffins react with sulfuric acid in the formation of the doubly ionized isobutyl lyate ion and methylene groups which are detached individually in the formation of the tertiary butyl hydroxonium ions which latter eventually react with the isobutyl lyate ions in the formation of the trimethyl pentanes. This fragmentation of the isoparaffins other than isobutane can not occur if the isobutane recycle concentration is such that the isobutane itself consumes all of the acid in the formation of the isobutyl lyate ions, thus allowing no opportunity for the isoparaffins other than isobutane to react. If the amount of isobutane recycle is such that no fragmentation of isoparaffins other than isobutane can occur then the reaction will proceed exclusively by direct alkylation, that is, the reaction of one mol of olefin with one mol of isobutane with the production of an alkylate having four more carbon atoms than the number of carbon atoms in the olefin molecule with the carbon atoms in the alkylate in the configuration delineated in the foregoing. Thus the minimum isobutane recycle requirements for direct alkylation becomes the maximum isobutane recycle permissible when isoparaffins other than isobutane are reacted with alkyl sulfates in the production of trimethyl pentanes. These various considerations pertinent to the concentration of the sulfuric acid and the relationship of the acid concentration to the isobutane recycle requirements can be illustrated by taking as an example, the alkylation with the alkyl sulfates formed by the reaction of pentylenes with 97.4% wt. sulfuric acid (7/1 $H_2SO_4/H_2O$ mol ratio) in the formation of pentyl sulfates with a yield of 1.7 moles of pentyl sulfate per mol of acid and with the recycling in the alkylation reaction of three mols of the acid liberated in the alkylation reaction for each mol of olefin reacted in the formation of the pentyl sulfates. Thus, since one mol of acid was reacted with 1.7 mols of the pentylenes in the formation of the pentyl sulfates, we have $1.0/1.7=.59$ as the mols of acid per mol of olefin. There are $4\times.59=2.36$ mols of acid in the alkylation reaction mixture since there are three mols of recycle acid per mol of olefin and one mol of acid is liberated in the alkylation reaction. The mols of water in the alkylation reaction mixture is $2.36/7=.33$ mol since there are seven mols of acid per mol of water in the sulfuric acid reacted in the formation of the pentyl sulfates. The minimum isobutane recycle will be .33 mol per mol of olefin since there must be a minimum of one mol of isobutane recycled per mol of water in the alkylation reaction mixture. For the case in which the product alkyl will be the trimethyl pentanes, the maximum permissible isobutane recycle will be 2.36 mols isobutane per mol olefin since more than one mol isobutane recycle per mol of acid limits the alkylation reaction to the direct type with preclusion of the formation of the trimethyl pentanes except, of course, in the case when isobutane is being alkylated with the butylenes. In the foregoing, it is to be understood that isobutane recycle is defined as the amount of unreacted isobutane on completion of the alkylation reaction. In the preparation of the initial alkylation reaction mixture the total isobutane content will be obtained by adding the isobutane recycle to the amount of isobutane consumed in the alkylation reaction which will be in accordance with Equation 9 for the production of trimethyl pentanes from isoparaffins other than isobutane, while in the direct alkylation one mol of isobutane will be consumed per mol of olefin reacted.

While the specification of the minimum and maximum acid concentrations as included in the foregoing is of great value in the understanding of the reaction mechanism as required for the most efficient utilization of the process of this invention, it is to be understood that these specifications must be interpreted in the light of the actual conditions which will prevail in the actual applications of this invention. For example, the water content of the acid actually used in the preparation of the alkyl sulfates may not be that circulated in the actual operation due to the water entering the process in solution or otherwise in the isoparaffins and olefins being reacted. Furthermore, some water may be a product of chemical reaction in the alkylation reaction. However, the water in the alkylation reaction mixture can be accounted for by the appropriate tests and corrections made as may be applicable and appropriate as, for example, by the addition of concentrated make-up acid and the withdrawal of the required amount of spent acid. Also the acid being circulated in the process may deteriorate due to misoperation and failure to adhere rigidly to the conditions specified for the preclusion of the reactions of polymerization and fragmentation of the olefins. In the case of such acid degradation the acid content is less than will be indicated by the conventional tests for acidity. The deterioration of the acid as a result of these undesirable reactions is explained by its accumulation of high molecular weight polymers which combine with the acid in the formation of mono-alkyl sulfates which do not react with hydroxonium ions as do the reactant olefins in accordance with Equation 8. In the event that acid deterioration does occur, the only recourse is to add fresh acid and withdraw acid as stated in the foregoing in accordance with the alkylation processes known heretofore. In the applications of the process of this invention in which there is the addition and withdrawal of acid, provision must be made for an appropriate adjustment of the isobutane recycle rate. The withdrawal of acid is a result of a lower acid to water ratio in the system than that of the acid added. The actual acid to water ratio of the system acid may not be known, but this is not a serious handicap because in actual practice the isobutane recycle and acid make-up and withdrawal rates will be so coordinated to give the most economical combination in the production of an alkylate of a selected quality. It is to be understood that alkylate of any specified quality can be selected dependent only on the ratios of the production of trimethyl pentanes and direct alkylation. The selection of the isobutane recycle rate is also influenced by the alkylation reaction rate which in turn is determined by the conditions selected for the alkylation reaction including, not only the acid recycle rate as presented in the foregoing, but the temperature and residence time of the alkylation reaction mixture.

In the selection of the residence time of the alkylation reaction mixture in the process of this invention, a first consideration is the temperature at which the reaction is completed. As is well known and as emphasized in the foregoing, concentrated sulfuric acid undergoes decomposition at elevated temperatures with highly undesirable reactions in the presence of hydrocarbons. It is also well known that the tendency of sulfuric acid to undergo decomposition in the alkylation reaction is wholly negligible at the temperatures which can be maintained with the readily available cooling water used for the dissipation of the heat evolved by the alkylation reaction. From these facts it follows that the temperature at which the alkylation reaction is initiated can be at least 100° F. and that the reaction may be substantially higher as may be desirable in some applications of this invention in which utilization of the heat of reaction may be desirable as referred to herewith. Usually the temperatures selected for the alkylation reaction will be that at which the size of the cooler will be appropriate as fixed by the ordinary engineering considerations which determine the size of such equipment as commonly used.

Along with the considerations of temperature which determine the size of the alkylation reactor as stated in the foregoing, the acid recycle ratio must be taken into account, because the alkylation reaction actually takes place in the acid phase. The amount of the acid phase and its ratio to the hydrocarbon phase is determined, of course, by the ratio of the acid recycled to the solution of alkyl sulfates in the reactant isoparaffins. But here again the acid recycle ratio will be determined by the ordinary engineer considerations which govern the selection of the size of the alkylation reactor. Since the residence time of alkylation reaction mixture is determined by the temperature and acid recycle ratio, it is appropriate to select that acid recycle ratio at which the alkylation reaction can be completed at the temperature selected for the completion of the alkylation on the basis of the requirements for the limitation of acid decomposition as referred to in the foregoing.

While the ordinary engineering considerations can be used in the selection of the size of the alkylation reactor cooler as referred to in the foregoing, it is important to know that the selection of the very best combination of residence time of the alkylation reaction mixture, the temperature at which the reaction is completed and acid recycle ratio is facilitated greatly by my finding that kinetically the alkylation reaction in the process of this invention is strictly first order. In all cases, the time required for the completion of the alkylation reaction is determined by the time required for the self-ionization of the acid in accordance with Equation 1, notwithstanding the clear fact that the overall reaction is multi-molecular and the fact that the reaction of Equation 1 is bimolecular. In my extension of the exclusion principle I have found that the actual time required for the alkylation reaction is determined by the activation of the molecule of sulfuric acid in its liberation of an electron and that this time is very long in comparison with the time required for the switching of the electrons and hydrogen atoms betwen the two molecules involved in the self-ionization reaction. The fact that the overall reaction is first order makes straightforward the obtaining of the required data for the determination of the size of the alkylation reactor in that it is only necessary to determine the electrical conductance of the acid phase at appropriate time intervals at the temperatures of possible interest and correlate the data as required for the determination of temperature and reaction time relationships using the well known formulas applicable to chemical reactions of the first order. In the application of these formulas it is helpful to know that on completion of the alkylation reaction the electrical conductance of the acid phase is the same as that of the sulfuric acid reacted with the olefins in the preparation of the alkyl sulfates.

The conditions of lower temperatures and the lower acid recycle ratios which tend to relieve the unfavorable conditions which prevail in the interface during the mixing of the recycle acid with the solution of alkyl sulfates in the iso-paraffins are, of course, the conditions which suppress the alkylation reaction. It is for this reason that provision is made in the process of this invention for the preheating of the alkylation reaction mixture to a temperature such that the alkylation reaction will be initiated at a rate such that the reaction will be completed at the selected maximum temperature in an appropriate residence time as delineated in detail hereinafter. This provision for preheating the alkylation reaction mixture is alleviating the undesirable conditions which inevitably exist in the interface during mixing in that with preheating the ratio of the acid recycled to the reactants and still complete the alkylation reaction in a much shorter time than would be the case otherwise. The temperature to which the alkylation reaction is preheated will be selected such that there is evidence that the reaction is proceeding by a vigorous evolution of the heat of the alkylation reaction.

My establishment of the first order kinetics of the alkylation reaction in the process of this invention gives assurance that the pressure at which the reaction is conducted is without effect on either the kinetics or the chemical equilibrium involved in the overall reaction. This follows from the fact that the time required for the activation of the sulfuric acid molecules in the liberation of electrons in the self-ionization in the reaction of Equation 1 which is very long in comparison with the times for the formation of the hydroxonium ions in the reaction of Equation 2 and the alkyl hydroxonium ions in Equation 9 as well as the isobutyl lyate ions in the reaction of Equation 5 even though some of the isobutane may be in the vapor phase of the alkylation reaction mixture. From these findings it follows that the selection of pressures in the process of this invention will not be determined by the requirements of the alkylation reaction but the pressure will be selected on the basis of the temperature at which the isobutane is condensed for recycling.

In my delineation of the chemical mechanism of the alkylation reaction assurance was obtained that there will be no tertiary butyl sulfate in the alkylate product of the process of this invention. This is important in view of the great difficulties due to the presence of tertiary butyl sulfates in the product of the alkylation processes known heretofore. Though not recognized as such by others, it is established that tertiary butyl sulfates are present in these alkylates by the readiness with which the deleterious substance in these alkylates is decomposed thermally with the evolution of sulfur dioxide as one of the decomposition products, together with the fact that the deleterious substance is readily removed by the reaction of the alkylate product with such chemicals as cresols and alkyl amines. In the alkylation processes known heretofore the tertiary butyl sulfate is formed by the hydrogen transfer reaction in which one hydrogen atom is removed from the doubly ionized isobutyl lyate ion formed in accordance with Equation 5 as a result of the neutralization of one of its negative charges by its reaction with an alkyl hydroxonium ion with the liberation of a paraffin followed by the neutralization of the second negative charge by its reaction with a lyonium ion. This hydrogen transfer reaction can not occur in the process of this invention because of its preclusion by the provision for the presence of the reactant alkyl sulfates introduced into the alkylation reaction mixture with the charge. Specifically, with these alkyl sulfates present, the alkyl hydroxonium ions formed in accordance with Equation 4 and 8 must react exclusively in the alkylation reactions of Equations 6 and 7 because of the much greater reactivity of the covalent alkyl sulfates than the doubly ionized isobutyl lyate ions. For purposes of further illustration, it might be argued that in the process of this invention as the alkyl sulfates approach depletion the ratio of the alkyl hydroxonium ions to the isobutyl lyate ions might be such that the hydrogen exchange reaction occurs. This possibility is eliminated by the fact that in the process of this invention the alkyl hydroxonium ions are not in equilibrium with the alkyl lyate ions which result from the fragmentation of the olefins in their reaction with lyate ions in the processes known heretofore. These considerations which account for the presence of tertiary butyl sulfates in the alkylates of processes known heretofore focus attention on the importance of the absolute completion of the reaction of the alkyl sulfates in the process of this invention in order to eliminate their presence in the alkylate. Assurance of the completion of the reaction of the alkyl sulfates will be had when the electrical conductance of the acid phase is the same as that of the sulfuric acid with which the olefins are reacted in the preparation of the alkyl sulfates.

In the addition of the recycle acid to the solution of the reactant isoparaffins and reactant alkyl sulfates in the preparation of the initial reaction mixture it is of great importance that the mixing of these two streams be completed in the shortest possible time. This necessity for immediate and complete mixing is attributable to the fact that during the mixing there is always an interface in which the concentration of isobutane is insufficient to preclude the undesirable reactions which occur on the addition of alkyl sulfates to an excess of acid. This objectionable interface results from the gerater solubility in the acid of the alkyl sulfates in comparison with the solubility of isobutane. It is true that in the recycle acid there is some dissolved, or rather reacted, isobutane in the form of the doubly ionized isobutyl lyate ions, but the amount of such dissolved isobutane is insufficient to preclude the undesirable reactions in case the mixing is inadequate. Inasmuch as equipment is readily available for the required effective mixing of liquids having the physical characteristics of the recycle acid and the solution of isoparaffins and alkyl sulfates, it is not necessary to specify the design of the mixer which will serve adequately in the process of this invention. It is only necessary to emphasize the fact that the most effective mixing will be accomplished with a minimum increase in the actual temperature of the mixture in comparison with the temperature of the mixture computed on the basis of the mixture rule applicable in the computation of the mixtures of the solution of the alkyl sulfates in the isoparaffins with the recycled acid assuming that no chemical change occurs during mixing.

The temperatures permissible during mixing are influenced in an important way by the ratio of the recycle acid to the solution of alkyl sulfates in the isoparaffins because the greater the amount of the recycled acid there is a correspondingly greater amount of the undesirable interface. But the amount of recycle acid is fixed by its requirement in the reduction of the residence time of the alkylation reaction mixture to which mixing must be subordinated. The undesirable reactions in the interface is also decreased as the temperature is increased in the formation of the alkyl sulfates in the reaction of the olefins with sulfuric acid. But since the formation of the alkyl sulfates is a separate process, it is appropriate to emphasize the factors that can be controlled in the process of this invention. More importantly, the extent to which the undesirable reactions in the interface occur is determined by the temperature of the interface during mixing. The temperature increase during mixing can be controlled as desired by recourse to the apparatus and techniques available for use in the process of this invention. With the alkyl sulfates available from available sources and with any acid recycle ratio required it is possible to suppress the undesirable reactions in the mixing interface in the process to a satisfactory extent by recourse to the conventional equipment available for the cooling of liquids to the temperatures attainable with the readily available cooling water which in all cases will be less than 100° F. Recourse can be had to the even lower mixtures attainable with refrigeration under circumstances which require such extraordinary cooling. From observed data obtained in the correlations leading to the selection of an appropriate combination of residence time of the reaction mixture with the temperatures suitable for completion of the reaction mixture at the acid recycle rate permissible in mixing devices used in the preparation of the alkylation reaction mixture, it will be found that residence time in the order of 30 minutes will be sufficient for the various applications of the process of this invention.

On completion of the mixing of the recycle acid with the solution of the alkyl sulfates in the isoparaffins in the preparation of the alkylation reaction mixture and its preheating as required for initiation of the alkylation reaction all under the conditions appropriate to the process of this invention, the initial reactions are substantially homogenous as a result of the partial solution of isoparaffins in the acid phase due to the solubilization of the alkyl sulfates in their solution in the acid phase. While this effect is helpful during and immediately on completion of mixing, the reaction mixture becomes less homogenous as the reaction proceeds. These facts spotlight the impossibility of carrying out satisfactorily the alkylation of alkyl sulfates using an agitated vessel as an alkylation reactor as has been attempted in some of the alkylation processes known heretofore. In the case of the use of an agitated vessel as an alkylation reactor the amount of the highly undesirable interface as delineated in the foregoing is always at a maximum with the constant mixing of the products of the completion of the reaction with the initial reaction mixture. It is for this reason that in the process of this invention I have shown in the diagrammatic sketch the pipe coil type of reactor which with proper design assures a minimum of the undesirable interface unavoidable in the use of agitated vessels as alkylation reactors. In the pipe coil type of alkylation reactor there is an increase in the temperature of the alkylation reaction mixture with corresponding increase in the temperature which is highly beneficial for a number of reasons important among which is the increase in the rate of reaction with temperature as already referred to in the foregoing. With the pipe coil type of reactor the reactants are maintained in the intimate contact as required for the maintenance of the first order reaction kinetics to which reference has been made hereinbefore. As the temperature at which the alkylation reaction is increased at the end of the pipe coil type of alkylation reactor, there is a more favorable thermodynamic equilibrium in the final reactions involving only the acid, the alkylate and the isobutane recycle. More specifically on completion of the alkylation reaction all of the mono-alkyl sulfates will have disappeared completely in the reaction of Equation 8 with a maximum of the reaction of the acid with the production of the doubly ionized isobutyl lyate ions in accordance with Equation 5 and with the production alkylate which may be either the trimethyl pentanes produced in accordance with the formula of Equation 9 or the direct alkylation of one mol of isobutane with one mol of olefin according to the amount of isobutane recycle selected as specified in the foregoing.

In addition to the advantages of the pipe coil type of alkylation reactor specified for the process of this invention as presented in the foregoing there are other advantages among which is the fact that with appropriate flow velocity of the alkylation reaction mixture there is no back-mixing of the products of the alkylation reaction from a more advanced stage of the alkylation reaction to a less advanced stage of the reaction in a differential segment of the length of the reactor. While all these advantages are readily illustrated using the pipe coil type of reactor it is clear that these advantages can be had with other types of reactors such as the shell-and-type of reactor cooler. In some applications of the process of this invention it will be advantageous to provide an alkylation reactor of such design that some of the heat evolved in the alkylation reaction can be recovered for utilization in the fractionation of the alkylate in the preparation of the isobutane recycle and in the separation of the alkylate into two or more fractions of different volatilities as discussed hereinafter. Such recovery of heat is limited by the decomposition of the sulfuric acid as discussed in the foregoing. The maximum permissible alkylation reaction temperature can be established in any specific application by determination of the amount of sulfur dioxide liberated in the reaction. In any event the recovery of the heat of the alkylation reaction is of minor and incidental importance in comparison with the fact that the dissipation of the heat of the alkylation reaction by the cooling water ordinarily available makes unnecessary the recourse to refrigeration in the process of this invention with a corresponding reduction in cost in comparison with alkylation processes known heretofore.

Due to the relatively high temperatures at which the alkylation reaction is completed in the process of this invention, the acid separated for recycle and re-use will contain relative to the alkylation processes known heretofore relatively large amounts of isobutane in chemical combination with the acid due to presence of the doubly ionized isobutyl lyate ions of Equation 5. The isobutane thus combined with the acid is highly advantageous in that the isobutane thus reacted is carried back into the initial alkylation reaction mixture and reduces the amount of isobutane which must be recycled in the conventional procedure for inclusion in the initial alkylation reaction mixture. The chemical combination of the isobutane with the separated acid makes important the recovery of isobutane from the acid withdrawn for its re-use or other disposition. The isobutane in solution in the separated alkylate may be recovered for recycle using the well known conventional procedures. However, in the process of this invention the removal of the isobutane from the alkylate is facilitated by the fact that it being at a high temperature as separated from the acid the alkylate can be made free of isobutane by reducing the pressure of the de-isobutanizer sufficiently below the pressure at which the alkylate is separated from the acid. Generally the pressure in the de-isobutanizing step will be that the isobutane recycle can be condensed with the available cooling water as already stated in the foregoing. Operating with a higher pressure in the alkylation step than in the de-isobutanizing step, while not making the alkylation conditions particularly more favorable, is not in any way objectionable if the de-isobutanization is thereby facilitated sufficiently in comparison with the conventional de-isobutanizing techniques.

The de-isobutanized alkylate from the process of this invention should not contain such excessive amounts of tertiary butyl sulfate as to require its removal. In any event the tertiary butyl sulfates can be removed from the alkylate, if required, by the treatment of the alkylate with adsorbents such as alumina as is well known in the operation of alkylation processes known heretofore.

The fractional distillation of the alkylate is deserving of special emphasis since in addition to the usual separation of the alkylate into fractions of different volatilities there is the opportunity for the recovery of normal paraffins for their beneficiation in other processes. The utilization of isoparaffins other than isobutane in the process of this invention either in the production of trimethyl pentanes or in their direct alkylation makes possible the recovery of practically pure normal paraffins which heretofore could not be done due to the fact that the normally liquid isoparaffins and normal paraffins have substantially the same volatilities and reactivities in the processes known heretofore. By recourse to the processes of this invention the isoparaffins are completely utilized by their conversion into products differing so greatly in their volatilities from the normal paraffins that only simple distillation is required for the complete recovery of the normal paraffins. By their treatment in isomerization processes the normal paraffins can be converted into isoparaffins which in turn can be utilized in the process of this invention. Thus an entirely new program for the beneficiation of hydrocarbons is available in the process of this invention.

The fact that the normal paraffins can be recovered from their admixtures with the isoparaffins as set forth in the foregoing makes the process of this invention of great value in the beneficiation of the naphthas derived from the distillation of crude petroleum and other sources. In such naphthas there will be present in addition to isoparaffins and normal paraffins various other types of hydrocarbons including particularly the aromatic and naphthene hydrocarbons as well as the many types of organic sulfur compounds. The action of the sulfuric acid on these crude naphthas will be such that in addition to the isoparaffins and normal paraffins there are various other components of the naphthas which will be beneficiated as well in the process of this invention. For example, some of the naphthene hydrocarbons being unreactive with sulfuric acid will be concentrated with the normal paraffins. These concentrated hydrocarbons can be dehydrogenated to aromatics highly valuable as components of gasolines and for other uses with the accompanying production of hydrogen in the well known and widely used processes available for the beneficiation of naphthenic hydrocarbons. The aromatic hydrocarbons already present in the naphthas will be alkylated in the formation of the tertiary butyl benzenes and their homologs. The formation of these alkyl benzenes result from a reaction known as dehydroalkylation in which there is the hydrogenation of an olefin molecule by the removal of two hydrogen atoms for a molecule of isobutane with the formation of a tertiary butyl hydroxonium ion which then reacts with the alkylation of a molecule of the aromatics. While this dehydro-alkylation reaction has been long recognized, its mechanism has been delineated only by my recourse to the mechanism of the reaction in the alkylation of isoparaffins with alkyl sulfates as given in detail hereinbefore. This dehydro-alkylation reaction is effected by hydrogen transfer reaction which can occur in the process of this invention only in the presence of aromatics in the alkylation reaction mixture due to the reaction of the lyate ions with a molecule of aromatics in the formation of an aromatic lyate ion which in turn is alkylated by its reaction with the tertiary butyl hydroxonium ion. The aromatic lyate ions being more reactive than the alkyl sulfates account for the formation of the tertiary butyl hydroxonium ions which result from the reaction of a doubly ionized isobutyl lyate with the alkyl hydroxonium ions which are the products of the reaction of the alkyl sulfates with the hydroxonium ions. By a somewhat parallel reaction the sulfur compounds are reacted in the formation of products soluble in the acid phase whereby the alkylates as well as the non-reactive hydrocarbons are rendered substantially free of sulfur when the crude naphthas are a source of isoparaffins in the process of this invention.

In the process of this invention the reactive isoparaffins are those containing one or more tertiary hydrogen atoms. Branched chain hydrocarbons containing only primary, secondary and quaternary carbon atoms are non-reactive in the process of this invention. A tertiary hydrogen atom is one bonded to a carbon atom which in turn is bonded to three other carbon atoms. Throughout the foregoing presentation of the term "isoparaffins" has been used to designate isoparaffins having tertiary hydrogen atoms. This terminology is consistent with the parlance pertinent to the alkylation of the saturated hydrocarbons broadly designated as the paraffins.

In conclusion it can be asserted that this invention makes available a superior process for the alkylation of isoparaffins with alkyl sulfates. This superiority is attributable to my development and establishment of a process which is entirely different from the processes known heretofore for the alkylation of isoparaffins with alkyl sulfates. These processes known heretofore are the same processes that have been used for the alkylation of the olefins themselves rather than the alkyl sulfates which are an intermediate in that the alkyl sulfates are formed by the reaction of sulfuric acid in a process separate from the alkylation process. It has been long known that alkyl sulfates can be prepared by the reaction of sulfuric acid with the olefins without polymerization or other side reactions but there has been no justification for the production of such alkyl sulfates as an alkylation intermediate because of the limitations of the processes known heretofore for the alkylation of alkyl sulfates. The development and establishment of the process of this invention is the result of my complete delineation of all the reactions of all the alkylation processes known heretofore with the selection and utilization exclusively of those reactions useful in the process of this invention. My complete delineation of all these reactions and many other chemical reactions pertinet to but not directly involved in the alkylation reaction has been the result of my entirely new concept of the extra nuclear structure of the chemical elements and the relationships of the extra nuclear structure to the atoms of the chemical elements as a whole when they are in combination with other atoms.

I claim:

1. A process for the alkylation of reaction isoparaffins containing at least one tertiary hydrogen atom with alkyl sulfates prepared by the reaction of olefins of at least three carbon atoms per molecule with aqueous sulfuric acid in which the sulfuric acid content is within the range of 96.4 percent to 98.2 percent sulfuric acid by weight, comprising the steps of dissolving the alkyl sulfates in the mixture of the reactant isoparaffins, mixing the solution of the alkyl sulfates in the isoparaffins with a recycle stream of the acid which is a product of the alkylation reaction, maintaining the temperature in said mixing step at less than 100° F. during the mixing in the preparation of the alkylation reaction mixture, preheating the resulting mixture to initiate the alkylation reaction, completing the alkylation reaction in a flowing stream at a constantly increasing temperature, flowing the alkylation reaction mixture during the alkylation reaction through a confined linear flow path to maintain effective contact between the components of the reacting mixture while simultaneously maintaining a minimum of back-mixing of the alkylation reaction mixture from a point at which the reaction mixture is in a more advanced stage of reaction to a point at which the reaction is less advanced, thereafter separating alkylate containing unreacted isoparaffins from the acid phase, withdrawing the acid phase in two portions, cooling one of said acid portions with water, recycling and mixing with the solution of alkyl sulfates in the isoparaffins, reducing the pressure and temperature of the other portion of the separated acid phase to recover isoparaffins in the acid phase, conducting the said other portion of acid substantially free from isoparaffins to storage for reuse in the alkylation step at a temperature substantially less than the temperature at which the reaction is complete in the formation of the alkylate, withdrawing the alkylate following the separation of the acid phase, and fractionating the withdrawn alkylate for recovery of various fractions of the alkylate and the non-reactive substances introduced into the process with the isoparaffins.

2. The process of claim 1 in which the reactant isoparaffins are a mixture of isobutane and other isoparaffins with the reactant isobutane so proportioned that its amount when designated by the symbol C is in accordance with the formula $A+B-8/4=C$ in which A represents the average number of carbon atoms per mol of the olefins reacted in the formation of the alkyl sulfates and in which the number of mols of olefins in the reacting mixture is not less than the number of mols of said other isoparaffins in the reacting mixture and the number of mols of recycled isobutane is less than the mols of acid in the reacting mixture but greater than the mols of water in the reacting mixture and the product alkylate consists predominantly of the trimethyl pentanes.

3. The process of claim 1 in which the other isoparaffins are in admixture with normal paraffin hydrocarbons, said normal paraffins being nonreactive in the alkylation reaction and contained in the product alkylate, separating said normal paraffin hydrocarbon from said product alkylate in the fractionating step.

4. A process for the alkylation of at least one reactive isoparaffin containing at least one tertiary hydrocarbon atom with at least one alkyl sulfate prepared by the reaction of at least one olefin of at least three carbon atoms per molecule with aqueous sulfuric acid in which the sulfuric acid content is within the range of 96.4 percent to 98.2 percent sulfuric acid by weight, comprising the steps of dissolving the alkyl sulfate in the reactant isoparaffin, mixing the solution of the alkyl sulfate in the isoparaffin with a recycle stream of the acid which is a product of the alkylation reaction, initiating and completing the alkylation reaction in a flowing stream at a constantly increasing temperature from the mixing step, flowing the alkylation reaction mixture during the alkylation reaction through a confined linear path to maintain effective contact between the components of the reacting mixture while simultaneously maintaining a minimum of backmixing of the alkylation reaction mixture from a point at which the reaction mixture is in a more advanced stage of reaction to a point at which the reaction is less advanced, thereafter separating alkylate containing unreacted isoparaffin from the acid phase, and reducing the temperature of at least a portion of said acid phase, recycling and mixing said cooled acid phase with the solution of the alkyl sulfate in the isoparaffin.

5. A process as in claim 4 including the step of preheating the resulting mixture of acid, alkyl sulfate and isoparaffin to initiate the alkylation reaction.

6. A process as in claim 4 including the steps of reducing the temperature and pressure of the remaining portion of the acid phase to recover any isoparaffin therein and conducting the substantially isoparaffin free acid to storage for reuse at the alkylation step at a temperature substantially less than the temperature at which the reaction is complete in the formation of the alkylate.

7. A process as in claim 6 wherein the nonrecycled acid is pressure and temperature reduced to recover any isoparaffin therefrom and the isoparaffin is recycled to the mixing step.

8. The process of claim 4 in which, in the preparation of the alkylation reaction mixture, the temperature during mixing and on completion of the mixing is maintained at less than 100° F.

9. The process of claim 4 in which isobutane is the reactant isoparaffin and in which the isobutane recycled is more than one mol per mol of acid in the alkylation reaction mixture.

10. The process of claim 4 in which the reactant isoparaffin is isobutane and the isobutane recycle is less than one mol of isobutane for each mol of acid in the alkylation reaction mixture but more than one mol of isobutane for each mol of water in the alkylation reaction mixture and the alkylate product is substantially limited to the trimethyl pentanes.

References Cited in the file of this patent

UNITED STATES PATENTS

| | | |
|---|---|---|
| 2,314,333 | Francis | Mar. 23, 1943 |
| 2,381,041 | De Jong | Aug. 7, 1945 |
| 2,431,500 | Penick | Nov. 25, 1947 |
| 2,491,618 | Luetzelschwab | Dec. 20, 1949 |
| 2,649,486 | Putney | Aug. 18, 1953 |